United States Patent [19]
Furukawa et al.

[11] 3,851,405
[45] Dec. 3, 1974

[54] FLUIDIZING DEVICE

[75] Inventors: Kenji Furukawa, Tokyo; Hirofuji Uyama, Yokohama; Takashi Tsuchiya, Shin-Nanyo; Chikashi Kido, Iwakuni; Keiichi Torii, Yokohama, all of Japan

[73] Assignee: Agency of Industrial Science & Technology, Tokyo, Japan

[22] Filed: Mar. 30, 1973

[21] Appl. No.: 346,323

[30] Foreign Application Priority Data
May 11, 1972   Japan.................. 47-45882

[52] U.S. Cl.................. 34/57 A, 432/58, 23/288 S, 165/104
[51] Int. Cl............................................ F26b 17/10
[58] Field of Search.................. 431/10, 57 R, 57 A; 432/15, 58; 208/163, 164; 23/288 S; 165/104

[56] References Cited
UNITED STATES PATENTS

| | | | |
|---|---|---|---|
| 2,455,561 | 12/1948 | Creelman | 23/288 S |
| 2,536,099 | 1/1951 | Schleicher | 34/57 A X |
| 2,687,343 | 8/1954 | Crask et al. | 23/288 S |
| 2,718,491 | 9/1955 | Green | 23/288 S X |
| 2,931,711 | 4/1960 | Walker | 34/57 A X |
| 2,948,671 | 8/1960 | Packie et al. | 208/163 X |
| 2,952,617 | 9/1960 | Haig | 208/163 X |
| 3,031,769 | 5/1962 | Wilson | 34/57 A |

Primary Examiner—William F. O'Dea
Assistant Examiner—William C. Anderson
Attorney, Agent, or Firm—Kurt Kelman

[57] ABSTRACT

In a fluidizing device adapted to effect chemical reaction, heat transfer, material transfer, etc. and provided with a cyclone unit, a plurality of internal members made of bars or tubes are disposed at fixed intervals within a free board section formed above the fluidized bed. When the fluidizing device has the internal members disposed as described within the free board section, agglomerates of constituent particles of the fluidized bed which fly out of the fluidized bed come into contact with the said internal members, with the result that the kinetic energy possessed by each agglomerate of particles is gradually consumed in the course of several contacts and the vertical component of the speed vector of the agglomerate of particles flying toward the cyclone unit is proportionally decreased. Consequently, the amount of fine particles produced due to collision into the inner wall surface of the column is markedly decreased and at the same time the absolute amount of particles flying into the cyclone unit is decreased to a great extent.

5 Claims, 4 Drawing Figures

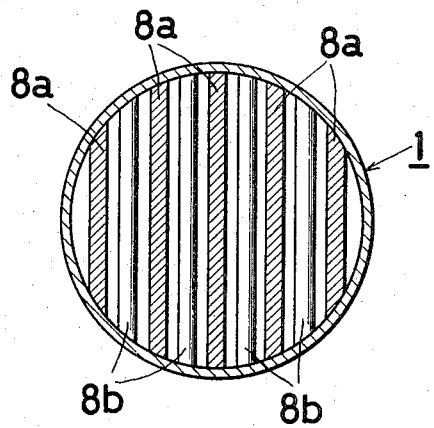
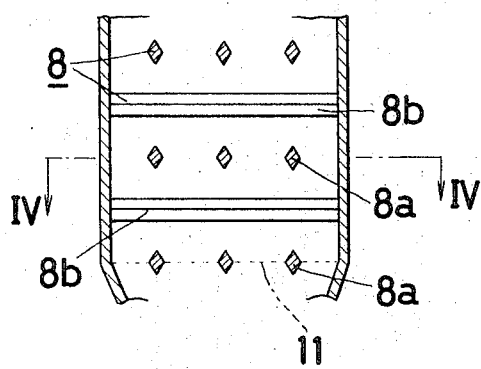
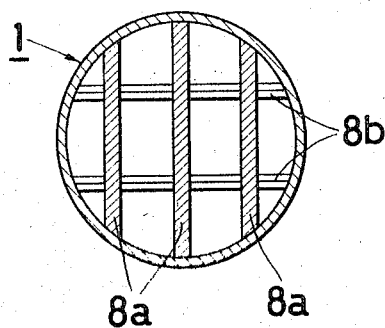
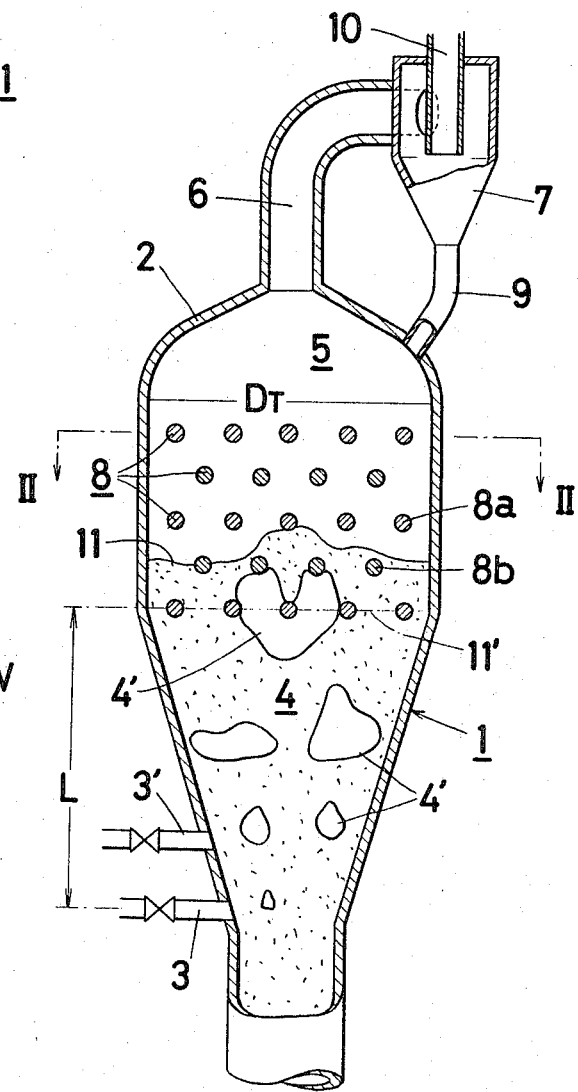

FLUIDIZING DEVICE

BACKGROUND OF THE INVENTION

This invention relates to a fluidizing device, more particularly to a fluidizing device of the type having a free board section formed over the fluidized bed, which device has internal members disposed within the said free board section so that agglomerates of particles flying out of the fluidized bed formed of the same constituent particles come into contact with the internal members to markedly decrease the amount of particles flying out of the free board section and the proportion of fine particles produced.

It is widely known that a fluidizing device having a free board section formed in the upper inner section thereof can be employed for the purpose of effecting chemical reaction, heat transfer and mass transfer on a given solid by passing fluidizing gas upwardly from the lower portion of the device.

In the case of a column which is filled on the inside with particles and provided at the bottom portion with a nozzle designed to permit introduction of a fluidizing gas, for example, the fluidizing gas fed into the fluidized bed converts itself into bubbles which ascend through the column interior while gradually gaining in size. The bubbles rupture when they reach the boundary of the fluidized bed.

If, in this case, the bed depth is larger than the inside diameter of the column, then each bubble formed by the gas grows by more than one third of the inside diameter and entrains an agglomerate of particles having substantially the same diameter as the bubble by the time the bubble reaches the boundary of the fluidized bed and ruptures in the direction of the free board section formed on the fluidized bed. The kinetic energy possessed by the agglomerate of particles at the time of rupture is shown by actual measurement to reach the order of 1,000 – 3,000 kg.m in the case of a large fluidizing device having a column diameter exceeding 1 meter. The agglomerate of particles which is hurled up by the ruptured bubble collides into the upper wall enclosing the free board section so that the particles are reduced in size. If the residence time of the gas within the free board section is shortened in this case, the magnitude of the energy with which the agglomerate of particles collides into the upper wall is increased and the amount of fine particles produced becomes more than 10 times as large as the amount of fine particles produced during travel in the fluidized bed. In order to repress micronizing of particles one has no alternative but to increase the height of the free board section or decrease the linear velocity of the fluidizing gas. Such measures are undesirable from the standpoint of equipment design and operational economy. Any attempt to increase the residence time must be avoided by all means where the gas is a reaction product and entails a treatment for quenching. For this reason, the residence time of the gas in the free board section is generally fixed at an appropriate value on the basis of factors such as those described above.

A primary object of this invention is to provide a fluidizing device having a smaller free board section over the fluidized bed so as to markedly decrease the residence time of the gas therein and appreciably decrease the amount of fine particles produced.

Another object of this invention is to provide a fluidizing device adapted to decrease the amount of particles which fly into the cyclone unit.

Still another object of this invention is to provide a fluidizing device adapted to decrease the variation in the pressure inside the column. Since the variation of pressure is decreased in the fluidizing device of this invention, the design of the column itself is made easier. Even when a particle circulation system is formed with a plurality of columns, pressure balance can easily be calculated and the design of the system consequently becomes easy. In addition, the particle circulation can be stabilized to an increased degree.

SUMMARY OF THE INVENTION

The present invention accomplishes the objects described above by horizontally disposing, in a fluidizing device which is adapted to effect chemical reaction, heat transfer, mass transfer, etc. and provided with a cyclone unit, a plurality of internal members within the free board section formed over the fluidized bed of the device. Agglomerates of constituent particles of the fluidized bed which are hurled out of the fluidized bed come into contact with the said internal members. The kinetic energy possessed by each agglomerate of particles is consumed on each of several contacts with the internal members and the vertical component of the velocity vector of the agglomerate of particles thrown in the direction of the cyclone unit is consequently lowered, with the result that the amount of fine particles produced due to collision with the inner wall surface is decreased and at the same time the amount of particles flying into the cyclone unit is decreased. This prevention of particles from size reduction helps decrease the loss of particles and also precludes various problems which would result from comminuted particles flying out of the system. Also the gradual consumption of the kinetic energy possessed by agglomerates of particles results in a decrease in the variation of pressure within the column, making the design of the system easier.

Other objects and other characteristics of the present invention will become apparent from the description of this invention made hereinafter in further detail with reference to the attached drawing.

BRIEF EXPLANATION OF THE DRAWING

FIG. 1 is a side elevational view in longitudinal section illustrating one preferred embodiment of the fluidizing device according to the present invention.

FIG. 2 is a sectional view taken along the II—II line of the device shown in FIG. 1.

FIG. 3 is a side view in longitudinal section of an essential component of another preferred embodiment of the fluidizing device according to the present invention.

FIG. 4 is a sectional view taken along the IV—IV line of the device shown in FIG. 3.

DETAILED DESCRIPTION OF THE INVENTION:

Referring to FIG. 1, the column 1 has a dome-shaped converging wall 2 as its upper shell and incorporates a free board section 5 in the upper interior thereof. It is provided in the lower inner portion with a main nozzle 3 and an auxiliary nozzle 3'. The fluidizing gas is introduced into the column 1 via the said nozzle 3. The gas gives rise to bubbles 4', which ascend through the fluidizing bed 4 formed within the column while gradually gaining in size. At the boundary 11 of the fluidized bed, the bubbles rupture. Because of the force from the rupture, the agglomerate of particles entrained by each bubble pass through the free board section 5 and collide into the converging wall 2 and consequently undergo size reduction. A portion of these particles are hurled through the pipe 6 whose lower end opens at the crest of the converging wall and thrown into the cyclone unit 7.

The imaginary boundary falling midway between the boundary 11 existing at the time a bubble ruptures and the boundary formed at a lower level after the rupture of the bubble is taken as the mean boundary 11'. If the distance L from the mean boundary 11' to the main nozzle 3 (hereinafter referred to as "height of fluidized bed") is larger than the inside diameter $D_T$ of the column, each bubble formed by the gas gains in size so that the diameter thereof in the cross-sectional direction reaches more than one third of the inside diameter $D_T$. By the time the bubble reaches the boundary of the fluidized bed, it has come to entrain agglomerates of particles whose diameters total roughly the same size as the diameter of the bubble. On arrival at the boundary 11, the bubble ruptures in the direction of free board section 5.

Actually, the kinetic energy possessed at this time by the agglomerate of particles is found by measurement to be as great as 1,000 to 3,000 kg.m in the case of a large fluidizing device whose column diameter $D_T$ exceeds 1,000mm. The particles are hurled, intact, upwardly through the said free board section 5. Then they collide into the converging wall 2 constituting the upper shell of the column and consequently undergo size reduction. The particles now in a reduced size are thrust upward through the pipe 6 whose lower end opens at the crest of the converging wall 2 and thrown in a certain particle concentration into the cyclone unit 7, wherein they are divided into two groups, one of coarse particles and the other of fine particles (up to $15\mu$ in grain size). If, in this case, the residence time of the gas within the free board section 5 is shortened, then the energy with which the agglomerate of particles collide into the converging wall 2 is increased so much that the amount of fine particles produced increases to more than 10 times the amount of fine particles which are reduced in size during the travel through the fluidized bed 4. In order to lengthen the residence time of the gas within the free board section 5, one has no alternative but to increase the height of the free board section or decrease the linear velocity of the gas. Such measures prove to be disadvantageous and impractical from the viewpoint of equipment design and operational economy. If the gas happens to be a reaction product and consequently entails a treatment for quenching, lengthening of the residence time should be avoided for the benefit of reaction. For this reason, the residence time of the gas within the free board section 5 has heretofore been fixed at an appropriate value on the basis of the factors mentioned above.

The inventors conducted studies in an effort to overcome the drawbacks described above. Their studies led to the discovery that the amount of fine particles and the amount of particles which fly into the cyclone unit are both decreased markedly by having a plurality of bar- or tube-shaped internal members 8 disposed horizontally. The agglomerates of particles which fly through the mean boundary 11' of the fluidized bed 4 come into contact with the internal members 8 while passing through the free board section 5. Consequently the kinetic energy of each agglomerate of particles is gradually consumed on each of several contacts with the internal members 8, with the result that the vertical component of the velocity vector of each agglomerate of particles in flight is gradually decreased, the size reduction of particles due to collision into the converging wall 2 of the column is prevented as much as possible and the amount of particles flying out in the direction of the cyclone unit 7 is decreased.

If the superficial velocity is fixed at a value greater than $1.5 \times U_t$ (terminal velocity) which is calculated by using Allen's formula, each agglomerate of particles is split into smaller agglomerates upon contact with the internal members. The split agglomerates of particles readily ascend in conjunction with the gas along the line of deflected flow of gas, with the result that the amount of particles colliding into the converging wall 2 increases and the amount of fine particles consequently increases. For this reason, it is desirable to fix the superficial velocity below $1.5 \times U_t$. To reduce the total amount of fine particles, it is desirable that the magnitude of the energy which can be absorbed from each agglomerate of particles by each of the internal members should be about 10 percent of the total energy possessed by each agglomerate of particles. For this purpose, the design of each of the internal members must satisfy the following requirements.

First, the width $d$ in the horizontal direction of each internal member 8 should fall in the range of 0.1 – 0.01 times the height $L$ of the fluidized bed. If the width is larger than 0.1 times the height $L$, the magnitude of energy absorbed from the agglomerate of particles in each stage increases, size reduction of particles occurs in the form of voluminal breakage and the amount of fine particles produced tends to increase sharply. If the width $d$ is smaller than 0.01 times the height $L$, the magnitude of energy absorbed per collision from the agglomerate of particles decreases. In this case, the number of stages in which the internal members are disposed must be increased in order that the amount of particles flying out toward the cyclone unit and the amount of fine particles produced may both be decreased. This entails the necessity of sufficiently increasing the height of the free board section 5, with the result that the residence time of the gas within he free board section is lengthened proportionally. Thus, the objects of the present invention cannot be accomplished if the width falls outside the range indicated above.

The bar or tube which forms the internal member should desirably have a cross section such that particles do not collide into the internal member in a direction perpendicular to the surface of the member. Thus, the internal member should not possess a flat surface. In other words, it should have a circular or an elliptic cross section. The cross section of the internal members is not necessarily limited to said shapes. For example, an internal member having a rhombic cross section may be disposed in such way that the acute-angled corners fall in a line which runs perpendicularly to the fluidized bed. Where a plurality of internal members are disposed horizontally in a plurality of suitably spaced stages, these internal members are desired to have a circular or an elliptic cross section in order that agglomerates of particles may, upon contact therewith, be deprived sufficiently of their kinetic energy and at the same time those agglomerates of particles which have had their courses of travel complexly changed because of contact with the internal members so as to fall in the direction of the fluidized bed boundary may be prevented from colliding into the internal members perpendicularly to their surface.

The projected area ratio of the internal members to the cross section of the free board section (the ratio of the combined projected area of all the bar or tube internal members disposed inside the column against the area of the cross section of the free board section) is a factor which has a large effect on the amount of particles which fly through the boundary. If this ratio if smaller than 0.4, for example, then the amount of particles which fly through the space between the internal members and collide into the converging wall 2 increases and the amount of fine particles produced is proportionally increased. Desirably, therefore, this ratio should exceed 0.5.

The manner in which the individual internal members are arranged is not particularly limited. They may be arranged in any manner which proves to be suitable for the purpose of use. The interval from one internal member to the nearest neighboring internal member is, however, desirably fixed in the range of from 0.05 to 0.3 times the height $L$ of the fluidized bed. The statement that the internal members are disposed in a horizontal direction does not necessarily imply that straight bars or tubes are disposed at the said intervals in one horizontal plane to serve as internal members. For example, a case in which corrugated or arched bars or tubes are arranged so as to serve as internal members is also encompassed by the said statement.

In one preferred embodiment illustrated in FIG. 1 and FIG. 2, for example, a plurality of internal members 8 are disposed in a horizontal stage and a plurality of such horizontal stages are arranged at suitable vertical intervals in such way that the individual internal members disposed in the upper stage 8a and those in the lower stage 8b are staggered. In another preferred embodiment illustrated in FIG. 3 and FIG. 4, the aforementioned plurality of horizontal stages of internal members are arranged at suitable vertical intervals in such way that the individual internal members disposed in the upper stage 8a and those in the lower stage 8b form a latticework pattern.

When a plurality of horizontal stages are each having a plurality of internal members disposed horizontally are arranged at suitable vertical intervals, the projected area ratio accounted for by the individual internal members in each horizontal stage should fall in the range of from 0.2 to 0.5, the number of horizontal stages to be arranged should be at least 3, and the vertical interval between the horizontal stages should be in the range of from 0.05 to 0.3 times the height $L$ of the fluidized bed. The vertical intervals between stages need not be equal but may be varied as between the interval of the first and second stages and that of the second and third stages, for example, or the bars or tubes disposed to serve as internal members may have different diameters or may be spaced by different horizontal intervals as between the first and second stages, for example. If, in this case, the bars or tubes disposed in each stage to serve as internal members are spaced by a horizontal interval which is less than 0.02 times the height $L$ of the fluidized bed, then each agglomerate of particles on contact with the internal members undergoes size reduction in the form of voluminal breakage, with the result that the effect of repressing size reduction is totally lost or seriously degraded. For this reason, the said interval is desired to exceed 0.02 times the height $L$ of the fluidized bed.

The lowest stage of internal members may desirably be positioned in the neighborhood of the mean boundary 11'. The actual boundary of the fluidized bed is not fixed, for it incessantly rises and falls in consequence of the growth and rupture of gas bubbles. Even if the lowest stage of internal members 8 is positioned below the boundary, the objects of the present invention can fully be accomplished because the bubble 4' ascending through the fluidized bed toward the internal members collides into the internal members before arrival at the boundary so that the bubble has its ascending velocity reduced and at the same time it is split into smaller bubbles.

The material of which the internal members are made may suitably be selected to conform with the purpose for which the fluidizing device is used. Where the fluidizing device is to be operated under severe conditions, for example, the material for the internal members is required to have strength enough to withstand such harsh conditions. If the fluidizing device is employed for some chemical reaction, then the material to be selected should be such as not to affect the reaction involved. Examples of the materials which prove to be suitable include stainless steel, carbon steel and plastics.

When a fluidizing device has a plurality of internal members 8 so disposed inside the free board section 5 as to satisfy the requirements described above, the amount of fine particles which are produced in the fluidized bed to the cyclone unit can be decreased to one-half to one-third and the amount of particles which fly out toward the cyclone unit can be decreased to one-fifth to one-tenth, compared with a device devoid of such internal members.

In a fluidizing device incorporating a cyclone unit, the phenomenon of particle size reduction entails steps of removing comminuted particles and consequently making up for the removed particles. These steps impose increasingly more burden on the operation in proportion as the device gains in size. According to the present invention, the amount of fine particles produced is decreased to one-half to one-third. Thus, this invention can markedly decrease the loss of particles and lessen the burden of the said steps relating to the comminuted particles. At the same time, the amount of particles which fly out in the direction of the cyclone unit is decreased to one-fifth to one-tenth as described above. Consequently, the design of the cyclone unit and the dipleg is facilitated. When the present invention is applied to a high-temperature decomposition system, the residence time of the gas can be shortened to 0.7 to 1.0 sec. and the variation of pressure due to rupture of bubbles and the variation of pressure which occurs within the fluidized bed because of the falling return of the agglomerates of particles once thrust through the boundary can be deceased to less than one-half.

This effect of decreasing the variation of pressure is particularly conspicuous where the harmonic mean diameter is not smaller than 0.4mm. The effect is such as to permit use of large size particles in a fluidized bed of a large scale. In terms of the mixing efficiency of particles, the present invention far excels the conventional device which involves the use of internal members within the fluidized bed.

Furthermore, the eventual fluctuating variation in the amount of particles flying out into the cyclone unit can be decreased to a great extent.

The present invention can be practiced with existing devices after a simple modification. Thus, the invention can readily be put to effect and proves to be greatly advantageous from the economic point of view.

DESCRIPTION OF THE PREFERRED EMBODIMENTS

With a view to ascertaining the effect of the present invention, one fluidized device was operated under a fixed set of conditions, with internal members disposed within the free board section in one run and with no internal members used in another run, to determine how much the amount of fine particles (having the maximum diameter of 15 $\mu$) and the amount of particles flying out in the direction of the cyclone unit is varied by the use of internal members. These operations will be described below by way of citing preferred embodiments of this invention. The examples are not to be considered to limit the invention.

Example 1

A column having an inside diameter of 1,500 mm was used. As readily disintegrable particles, there were used coke particles having a compressive strength of 80 – 150 kg/cm$^2$ and a specific gravity of 1.95.

The minimum fluidization velocity was fixed at 180 mm/sec, the height $L$ of the fluidized bed at 2,500 mm and the height of the free board section at 1,500 mm respectively.

As internal members, 23 carbon steel-made tubes 73.5 mm (3 inches) in diameter having a circular cross section were prepared. They were disposed in five stages, spaced by uniform vertical intervals of 300 mm, with the individual internal members in each successively lower stage and those in the immediately upper stage staggered. The projected area ratios of the internal members in the alternating stages were 0.27 and 0.31 and the total projected area ratio to the area of the cross section of the column was 0.58.

By introducing nitrogen gas through the main nozzle and the auxiliary nozzle into the column, a bed of coke particles was fluidized. The nitrogen gas was caused to give rise to bubbles within the fluidized bed and the bubbles were allowed to fly through the boundary 11 into the free board section 5 while entraining agglomerates of particles. In this case, the gas velocity at half the height of the free board section 5 (at the middle point between the boundary 4' and the converging wall 2) was fixed at 3 m/sec and the residence time of the gas in the said free board section at 0.5 sec.

When the said internal members were disposed in the free board section 5, the amount of coke particles entrained by a unit volume of the gas passing the pipe 6 was 10 kg/m$^3$. This quantity of entrained coke particles increased to as much as 50 kg/m$^3$ when the internal members were removed.

The gas entraining coke particles entered the cyclone unit 7, in which the particles were divided into two groups, one of coarse particles over 15 $\mu$ in grain size and the other of particles of smaller grain size. The coarse particles of the former group were returned to the column via the circulation pipe 9 laid to connect the cyclone unit and the column. The fine particles of the latter group were withdrawn from the system via the pipe 10. The fine particles withdrawn via the pipe 10 were collected by a filter and weighed. The quantity of fine particles thus collected per unit gas volume was 12 g/m$^3$ when the internal members were disposed in the free board section. It increased to as much as 25 g/m$^3$ when the internal members were removed.

The amount of fine particles produced within the fluidized bed per unit volume of the passing the pipe 10 was invariably 5 g/m$^3$, irrespectively of the presence or absence of internal members.

Example 2

A hydrocarbon decomposoing system using a column 600 mm in inside diameter was used. As readily disintegrable particles, there were used coke particles having a specific gravity of 1.95 and compressive strength of 200 – 300 kg/m$^2$. The minimum fluidization velocity was fixed at 250 mm/sec, the height $L$ of the fluidized bed at 1,600 mm and the height of the free board section at 1,500 mm respectively.

As internal members, 13 stainless steel bars having a rhombic cross section of a uniform side of 50 mm were used. At uniform vertical intervals of 200 mm, three stages each containing three bars and two stages each containing two bars were arranged alternately, with the individual internal members in each adjacent pair of stages running perpendicularly to each other as illustrated in FIG. 3 and FIG. 4. In each stage, the internal members were horizontally spaced uniformly by 200 mm. The total projected area ratio of the internal members to the cross section of the column was 0.60.

By introducing crude oil via the main nozzle and steam via the auxiliary nozzle 3' respectively into the column kept at about 800°C the bed of coke particles was fluidized.

The superficial velocity of the gas at half the height of the free board section over the fluidized bed was fixed at 3 m/sec and the residence time of the gas within the free board section at 0.5 sec respectively during the operation.

The quanity of coke particles entrained by the unit volume of gas passing the pipe 6 was 0.5 kg/m$^3$ and the quantity of fine particles (up to 15 $\mu$ in grain size) per unit volume of the gas passing the pipe 10 was 2g/m$^3$ where the said internal members were disposed in the free board section. When the internal members were removed, the quantity of coke particles entrained by the unit volume of the gas passing the pipe 6 increased to 10 kg/m$^3$ and that of coke particles entrained by the gas passing the pipe 10 to 4 g/m$^3$ respectively.

The amount of fine particles produced within the fluidized bed per unit volume of the gas passing the pipe 10 was invariably 1 g/m$^3$, irrespectively of the presence or absence of internal members.

Example 3

In the column used in Example 1, a total of 14 carbon steel-made internal members of the same description were arranged in three stages, five each on the top and bottom stages and four in the middle stage, in such way that none of them overlapped with reference to the projected area in the vertical direction of the fluidized bed. In this arrangement, the projected area ratio of all the tubes to the area of the cross section of the column was 0.9.

By following the procedure of Example 1, coke particles having a compressive strength of 20 –60 kg/cm² were fluidized by introducing the gas at a superficial velocity of 4 m/sec. In this operation, the amount of coke particles entrained by the unit volume of gas passing through the pipe 6 was 12 kg/m³. This amount increased to 58 kg/m³ when the internal members were removed. The amount of fine particles produced per unit volume of gas was 18 g/m³ in this operation. This amount increased to 27 g/m³ when the internal members were absent.

What is claimed is:

1. In a fluidizing device incorporating a free board section of a fluidized bed, an improvement which comprises in combination a plurality of internal members each having a horizontal width of between 0.1 and 0.01 times the height of the fluidized bed and disposed in the free board section formed above the fluidized bed so that the interval between each internal member and the nearest neighboring internal member falls in the range of 0.05 to 0.3 times the height of the said fluidized bed and the projected area ratio of all the internal members to the area of the cross section of the free board section is not smaller than 0.5.

2. A fluidizing device according to claim 1, wherein the internal members in the lowest level fall in the mean boundary of the fluidized bed.

3. A fluidizing device according to claim 1, wherein the plurality of internal members are disposed in at least three horizontal stages spaced by vertical intervals falling in the range of between 0.05 to 0.3 times the height of the fluidized bed.

4. A fluidizing device according to claim 3, wherein the individual internal members in each successively lower stage and those in the immediately upper stage are staggered.

5. A fluidizing device according to claim 3, wherein the individual internal members in each successively lower stage and those in the immediately upper stage are disposed so as to form a latticework pattern.

* * * * *